United States Patent [19]
Wenzel

[11] 3,826,565
[45] July 30, 1974

[54] SPECTACLE FRONT HINGE PINNING SYSTEM

[75] Inventor: Ronald Arthur Wenzel, Norfolk, Mass.

[73] Assignee: The Hillsinger Corporation, Plainville, Mass.

[22] Filed: Apr. 26, 1973

[21] Appl. No.: 354,772

[52] U.S. Cl. ................. 351/121, 16/128 A, 16/169, 351/153
[51] Int. Cl. ........................... G02c 5/22, E05d 5/12
[58] Field of Search ............... 351/121, 153; 2/14 T; 16/128 A, DIG. 13, 168, 169

[56] References Cited
UNITED STATES PATENTS

| | | | |
|---|---|---|---|
| 2,774,098 | 12/1956 | Tieri | 351/121 X |
| 3,349,430 | 11/1967 | Rosenvold et al. | 351/153 X |
| 3,546,735 | 12/1970 | Liantaud | 16/168 X |

FOREIGN PATENTS OR APPLICATIONS

| 1,165,129 | 9/1969 | Great Britain | 16/168 |
|---|---|---|---|

*Primary Examiner*—Paul A. Sacher
*Attorney, Agent, or Firm*—Barlow & Barlow

[57] ABSTRACT

A spectacle front hinge pinning system having a front hinge connecting the temples of the spectacle to its frame. The front hinge has a plurality of mating barrels, each having its own bore with these bores being aligned. The spectacle hinge pin is inserted downwardly through the aligned bores in the barrels to maintain the barrels in aligned arrangement. The hinge pin has an elongated body made of a plastic material with a head formed on one of its ends. It has a shank portion extending from the head. A relieved section is formed adjacent the shank portion and it has a diameter less than that of the shank portion. A lead portion is located adjacent said relieved section and it has a barb formed thereon that extends transversely with respect to the axis of the lead portion outwardly beyond the outer surface of said relieved section to extend radially beneath the end lower barrel of the hinge.

5 Claims, 7 Drawing Figures

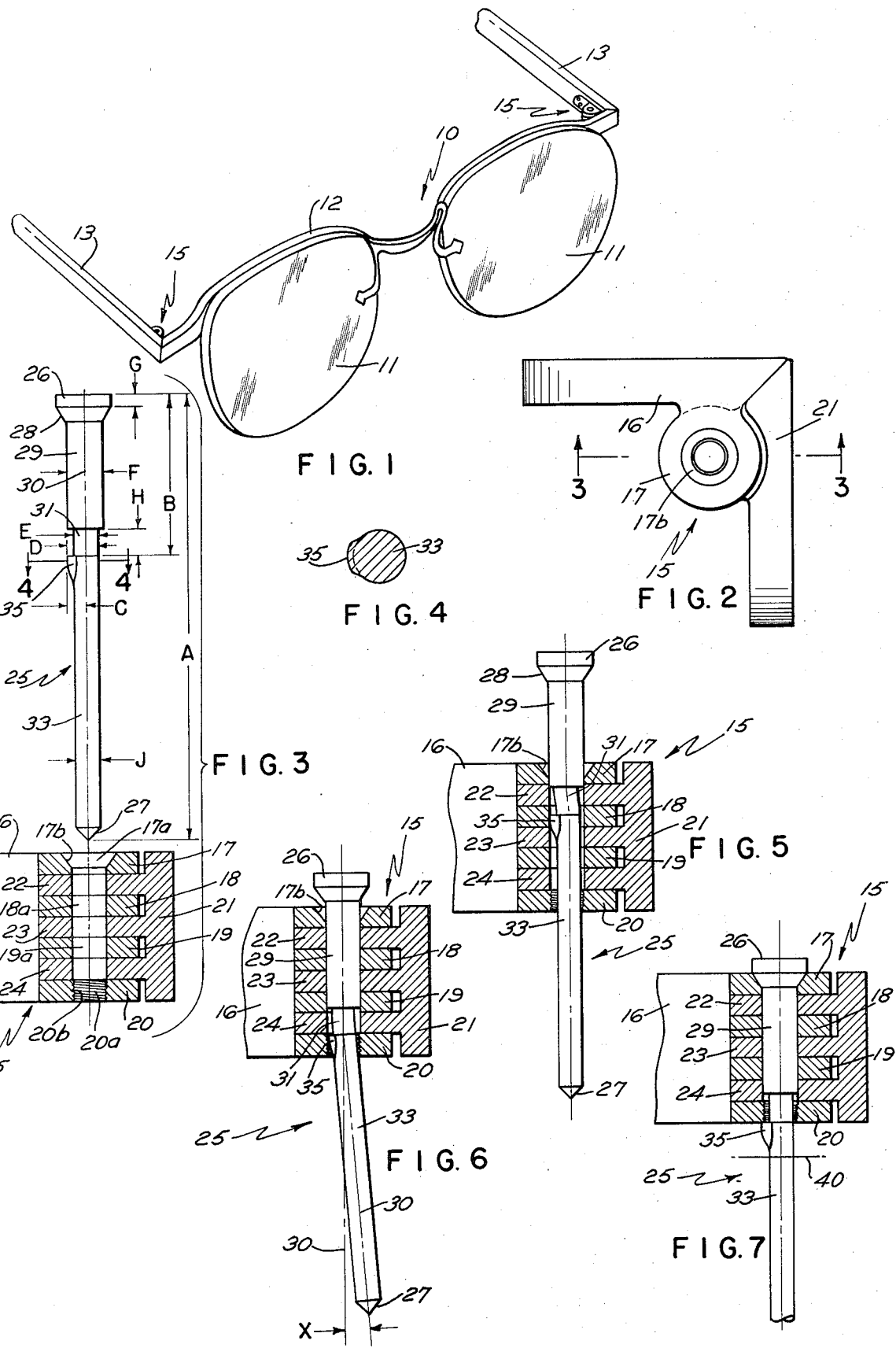

SPECTACLE FRONT HINGE PINNING SYSTEM

BACKGROUND OF THE INVENTION

The invention relates to a hinge pin and more specifically to a hinge pin such as used in connecting the temple members of a pair of spectacles to the frame thereof. The hinge structure utilized universally comprises a plurality of barrel sections on each hinge member which are positioned together in mating relationship with the barrels of each member alternating. These members are attached respectively to the temple and frame of the spectacle. Each of the barrel members has a bore and in mating position these would be aligned so that a hinge pin could be inserted therethrough. In the past all of these hinge pins have had a portion of their shank threaded and the threaded portion would mate with the threaded bore of one or more of said barrels to secure the different barrel sections together.

SUMMARY OF THE INVENTION

This novel spectacle front hinge pinning system which is utilized has for its basic components a pair of hinge members which mate with each other so that the bores of their barrel members are in alignment with each other. A hinge pin made of plastic material is passed downwardly through these aligned bores to secure the mating barrel members interleaved. The hinge pin itself has no threaded grooves on its outer surface nor does it require threaded mating sections within any of the bores of the barrel members. The hinge pin has an elongated body with a head at one end and a tip at the opposite end. A shank portion is spaced inwardly from the head of the body and it has a predetermined diameter. A relieved section is formed adjacent the shank portion and it has a diameter less than that of the shank portion. Next in structure is a lead portion also of less diameter than the shank having its one end adjacent the relieved section and having tapered tip formed at its opposite end. A barb is formed on the lead portion and it extends transversely of the axis of the lead portion outwardly beyond the outer surface of the relieved section. When the hinge pin is inserted through the aligned bores of the mated barrels, the lead portion extends downwardly therethrough. The tip is gripped and pulled downwardly until the transversely extending barb has passed beneath the bottom of the lowermost barrel. As this is happening, the barb causes the lead portion of the pin to be shifted laterally as the head of the pin seats in the counterbored section of the top barrel of the hinge. This shifting laterally causes the barb to be positioned so that it is caught beneath the surface of the lowermost barrel and maintains the pin securely in position. The excess portion of the lead would be removed as by cutting or breaking it off.

DESCRIPTION OF THE DRAWINGS

FIG. 1 is a perspective view illustrating a typical spectacle having a front hinge assembly;

FIG. 2 is a plan view of the hinge assembly;

FIG. 3 illustrates the mating barrel members of the hinge assembly in cross section and illustrates in elevation a hinge pin about to be inserted therein;

FIG. 4 is a section on line 4—4 of FIG. 3 somewhat enlarged;

FIG. 5 is a section which illustrates the hinge pin partially inserted into the mating barrel members of FIG. 3;

FIG. 6 is similar to FIG. 5 with the pin further inserted;

FIG. 7 is a section which illustrates the hinge pin fully inserted into the mating barrel members of FIG. 2 and showing the line of cutoff.

DESCRIPTION OF THE PREFERRED EMBODIMENT

Referring to FIG. 1 an ordinary pair of spectacles is illustrated having a front hinge assembly. The spectacles are generally designated numeral 10 and have a pair of lenses 11, a frame 12, and a pair of temple members 13. The temple members are attached to the frame by means of a hinge assembly 15. In FIG. 2 the hinge assembly has a spectacle front hinge 16 and a temple hinge 21. The front hinge 16 (FIG. 3) is comprised of a plurality of barrels 17, 18, 19 and 20 positioned in spaced relationship. Barrel 17 has a bore 17a and a counterbore 17b. Barrel 18 has a bore 18a and barrel 19 has a bore 19a of the same diameter as bore 17a. Barrel 20 has a bore 20a of a diameter less than that of the bores of barrels 17, 18 and 19 by reason of its threading 20b. The temple hinge 21 (FIG. 3) comprises barrels 22, 23 and 24 each having a bore of the same size as the bores 17a or 18a or 19a. These barrels 22, 23, 24 are interleaved with the barrels 17, 18, 19, 20 with the bores of the seven barrels aligned.

The hinge pin 25 (FIG. 3) is comprised of an elongated body having a head 26 at one end and a tapered tip 27 at its opposite end. The head has inwardly tapered surfaces 28 that connect with the shank portion 29. The axis of shank 29 is indicated by numeral 30 and the shank is of a predetermined diameter. A relieved section 31 is formed adjacent the shank portion and it has a diameter less than that of the shank portion. The lead portion 33 has its one end formed adjacent the relieved section and tapered tip 27 is formed at its opposite ends. A barb 35 is formed on the lead portion which extends transversely of the axis of the lead portion outwardly beyond the outer surface of the relieved section a portion only of a revolution.

The manner in which the barb functions to secure the hinge pin in position will be described by referring to FIGS. 3 thru 7. The hinge pin of FIG. 3 is inserted in the aligned barrels of the hinge assembly 15 until the barb 35 engages the tapered counterbore 17b. At this point the lead portion 33 of the pin which extends below barrel 20 is gripped and pulled downwardly. As this occurs the lead portion shifts laterally as seen in FIG. 5 and as the pin moves to its seat the lead portion will angle as seen at X in FIG. 6 and when seated the barb will locate beneath the lower surface of barrel 20 to secure the pin in position (FIG. 7). This has been accomplished by the nylon pin being shifted laterally and compressed as the head of the pin is seated in the counterbore 17b of barrel 17. Following this step the unnecessary portion of the lead of the hinge pin would be cut or in some other manner removed therefrom at line 40 (FIG. 7).

FIG. 4 illustrates a cross section of the hinge pin taken along line 4—4 of FIG. 3. It illustrates how the barb extends laterally outwardly around the minor portion of the lead portion 33 but not entirely around the 360° circumference of that portion.

A typical pin, the proportions of which are found satisfactory, is sized in decimal inches as follows with reference to FIG. 3:

A 0.725
B 0.285
C 0.0245
D 0.0245
E 0.041
F 0.048
G 0.025
H 0.045
J 0.040.

What is claimed is:
1. A spectacle hinge pin comprising
an elongated resilient body having a head at one end and a tip at the opposite end,
a shank portion extending from the head of the body with the shank portion of a predetermined diameter,
a relieved section adjacent said shank portion having a diameter less than that of said shank portion,
a lead portion having its one end adjacent said relieved section and having a tip formed at its opposite end,
barb means adjacent said relieved section formed on said lead portion that extend transversely of the lead portion outwardly beyond the outer surface of said relieved section,
said lead portion being of a diameter less than said shank and of a length greater than said shank portion whereby it may be grasped at its tip for pulling the pin into the hinge means.

2. A spectacle hinge as recited in claim 1 wherein said elongated body is made of a plastic material.

3. A spectacle hinge as recited in claim 1 wherein the diameter of the head of said elongated body is greater than the diameter of said shank portion and it has an inwardly tapering surface connecting these two members.

4. A spectacle hinge as recited in claim 1 wherein said barb means extends laterally outwardly of the outer surface of said lead portion but a portion of a revolution.

5. An ophthalmic mounting comprising a frame embodying a pair of spaced lenses, frame means for supporting said spaced lenses, a pair of temples, front hinge means for pivotally connecting said temples to said frame means, said front hinge means comprising a plurality of mating barrels and a spectacle hinge pin that passes down through aligned bores in said barrels, said spectacle hinge pin comprising
an elongated body having a head at one end and a tip at the opposite end, a shank portion extending from the head of the body with the shank portion of a predetermined diameter,
a relieved section adjacent said shank portion having a diameter less than that of said shank portion,
a lead portion having its one end adjacent said relieved section and having said tip formed at its opposite end,
barb means adjacent said relieved section formed on said lead portion that extend transversely of the axis of the lead portion outwardly beyond the outer surface of said relieved section,
said lead portion being of a diameter less than said shank and of a length greater than said shank portion whereby it may be grasped at its tip for pulling the pin into the hinge means.

* * * * *